US009166443B2

(12) United States Patent
Diegelmann et al.

(10) Patent No.: US 9,166,443 B2
(45) Date of Patent: Oct. 20, 2015

(54) ENERGY SUPPLY DEVICE FOR A HYBRID VEHICLE AND METHOD FOR OPERATING AN ELECTRIC HIGH VOLTAGE ENERGY STORAGE DEVICE

(75) Inventors: Christian Diegelmann, Munich (DE); Sebastian Scharner, Tuerkenfeld (DE); Michael Boeckl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1881 days.

(21) Appl. No.: 12/370,279

(22) Filed: Feb. 12, 2009

(65) Prior Publication Data

US 2009/0205890 A1 Aug. 20, 2009

(30) Foreign Application Priority Data

Feb. 16, 2008 (DE) .......................... 10 2008 009 568

(51) Int. Cl.
 B60L 9/00 (2006.01)
 B60L 11/00 (2006.01)
 H02J 7/14 (2006.01)
 B60L 11/18 (2006.01)
(52) U.S. Cl.
 CPC ........... *H02J 7/1446* (2013.01); *B60L 11/1861* (2013.01); *B60L 2250/18* (2013.01); *Y02T 10/7005* (2013.01); *Y02T 10/705* (2013.01); *Y02T 10/7044* (2013.01); *Y02T 10/92* (2013.01)
(58) Field of Classification Search
 CPC ............... H02J 7/1446; B60L 11/1861; B60L 2250/18; Y02T 10/7005; Y02T 10/7044; Y02T 10/705; Y02T 10/92
 See application file for complete search history.

(56) References Cited

U.S. PATENT DOCUMENTS

| 2003/0042866 A1* | 3/2003 | Minamiura et al. .......... 320/104 |
| 2005/0099155 A1* | 5/2005 | Okuda et al. ................. 320/107 |
| 2005/0212487 A1* | 9/2005 | Sodeno ......................... 320/132 |
| 2005/0256617 A1* | 11/2005 | Cawthorne et al. ............. 701/22 |
| 2007/0029121 A1* | 2/2007 | Saitou et al. ................. 180/65.2 |

FOREIGN PATENT DOCUMENTS

DE 103 02 860 A1 8/2004

OTHER PUBLICATIONS

Hommel et al., Machine Translaction of DE 10302860, Aug. 5, 2004.*
German Search Report dated Nov. 18, 2008 with English translation (nine (9) pages).

* cited by examiner

*Primary Examiner* — Mary Cheung
(74) *Attorney, Agent, or Firm* — Crowell & Moring LLP

(57) ABSTRACT

A method for operating an electric high voltage energy storage device of a hybrid vehicle with an electric drive motor, as well as an energy supply device, is provided. A predetermined working range of the high voltage energy storage device is shifted in the direction of the upper or lower physical charge limit as a function of the vehicle operating parameters and/or as a function of the vehicle environmental parameters.

16 Claims, 1 Drawing Sheet

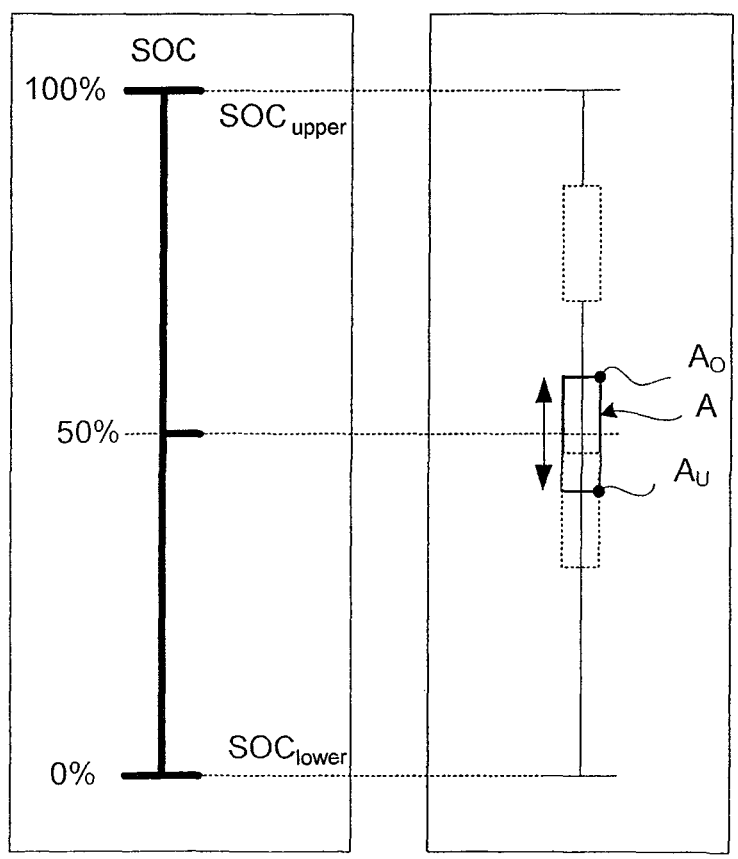

ENERGY SUPPLY DEVICE FOR A HYBRID VEHICLE AND METHOD FOR OPERATING AN ELECTRIC HIGH VOLTAGE ENERGY STORAGE DEVICE

CROSS-REFERENCE TO RELATED APPLICATION

This application claims priority under 35 U.S.C. §119 to German Patent Application No. DE 10 2008 009568.0, filed Feb. 16, 20062008, the entire disclosure of which is herein expressly incorporated by reference.

BACKGROUND AND SUMMARY OF THE INVENTION

The invention relates to a method for operating an electric high voltage energy storage device, as well as an energy supply device for a hybrid vehicle.

Currently it is known to operate high voltage accumulators—in particular, high voltage accumulators, based on lithium ion technology, with a nominal voltage greater than or equal to 60 V—within a predefined fixed operating range. This operating range is usually chosen in such a way that, on the one hand, a defined cold start (for example, a start of the internal combustion engine at −25° C.) has to be possible at any time (lower state of charge limit/minimum storage capacity) and that, on the other hand, there is (in the upward direction) adequate storage capacity (upper state of charge limit/maximum storage capacity) in order to be able to use the energy accumulator for brake energy regeneration.

The object of the invention is to provide a method for operating an electric high voltage energy storage device (in particular a high voltage energy storage device for supplying an electric drive motor of a hybrid vehicle), so that the result is a smaller design of said electric drive motor and so that slower ageing of the energy storage device is guaranteed. Furthermore, the object is to provide an energy supply device which comprises such a high voltage energy storage device, so that the size of the corresponding package is reduced and at the same time slower ageing of the energy storage device is achieved.

The invention is based on the knowledge that high voltage energy Accumulators—in particular, those that are designed on the basis of lithium ion Technology—age comparatively faster at high temperatures and/or at high states of charge than at lower temperatures and/or lower states of charge. Furthermore, as the ageing process of such energy accumulators increases, their performance decreases. In order to counteract these phenomena, a method and/or an energy supply device is proposed in accordance with the invention.

In the present invention, an electric high voltage energy storage device of a hybrid vehicle with an electric drive motor (in particular, a hybrid vehicle that can be operated by electrical means and/or by an internal combustion engine) is operated in such a manner that a predetermined working range of the high voltage energy storage device that is defined by an upper and a lower limit is shifted as a function of the vehicle operating parameters and/or as a function of the vehicle environmental parameters. The electric drive motor is defined for the purpose of the invention as an electric motor, by which it is possible to generate the torque that acts on the drive wheels.

The working range is shifted advantageously by shifting the upper and/or lower limit of the predetermined working range. In particular, the shift of the working range takes place by shifting the lower limit of the working range. In an additional advantageous design the entire breadth of the working range (the distance between the upper and the lower limit) is retained and shifted in its entirety. That is, the upper and the lower limits are shifted by the same degree (and/or the same amount) in the same direction.

Preferred vehicle operating parameters are for the purpose of the invention those parameters that correlate with the state of ageing of the energy storage device-in particular the cumulative operation period of the energy storage device (optionally weighted as a function of the states of charge that occur over the total operating time). An additional vehicle operating parameter that can be used as an alternative or as an addition in order to determine the state of ageing of the energy storage device is the energy throughput (energy throughput per defined period of time) through the energy accumulator. Furthermore, it is possible to determine the state of ageing by a computational algorithm, in particular as a function of the measurable variables of the battery, like the current, the cell voltages and the temperature. Preferred vehicle environmental parameters that can be mentioned are those parameters that correlate with the ambient air and/or the outside air temperature of the energy storage device or the motor vehicle. In this case special mention must be given to the vehicle ambient temperature, which is measured over a predetermined period of time, and/or its minimum temperature. It is advantageous to measure continuously the predetermined temperature variable (for example, the outside temperature) and to find as a function thereof a minimum temperature, on which an additional calculation is to be based. This so-called seasonal temperature may be used to differentiate between at least two temporal operating ranges (differing significantly in their lowest temperature)—for example, summer mode and winter mode—and to operate, as a function of the determined seasonal temperature, the energy storage device in the one or the other working range. The result is that for the case that the vehicle is to be started by the high voltage energy accumulator it is possible to guarantee a reliable start of the internal combustion engine even at low temperatures (cold start).

In addition, the intent is to carry out the shift of the working range as a function of the current operating mode of the vehicle (type of vehicle operating mode). In this case it is advantageous for a shift to occur as a function of which one of at least two different vehicle operating modes is currently on hand. In particular, a distinction is made between an engine start (start of the internal combustion engine), driving by just the electrical means, driving by just the internal combustion engine, a propulsion by the electric motor (motor driven) together with the internal combustion engine and a boost mode (call on maximum possible driving torque).

Analogous to the described method, there is provided an energy supply device which is intended for a hybrid vehicle (in particular, for a hybrid vehicle that can be operated electrically and/or by an internal combustion engine) and which comprises a high voltage energy storage device and a control unit for controlling the charging and discharging events of the energy storage device. In this respect the control unit is designed in such a manner that a predetermined working range of the high voltage energy storage device that is defined by an upper limit and a lower limit can be shifted as a function of the vehicle operating parameters and/or as a function of the vehicle environmental parameters.

The control unit is designed advantageously in such a manner that the shift is carried out by just shifting the lower limit of the working range. In another preferred embodiment the control unit can also be designed in such a manner that the working range is shifted in its entirety in one direction. That is, the upper limit and the lower limit are shifted in one and the same direction while at the same time retaining their distance and/or the range defined by said limits (or the charge quantity defined by them).

The high voltage energy storage device comprises energy storage elements, which are made advantageously on the basis of lithium ion technology. The control unit is designed advantageously in such a manner that the charging and discharging procedures of the high voltage energy storage device take place as a function of its state of ageing and/or as a function of the outside and/or vehicle ambient temperature.

Other objects, advantages and novel features of the present invention will become apparent from the following detailed description when considered in conjunction with the accompanying drawings.

BRIEF DESCRIPTION OF THE DRAWING

The single FIGURE in the drawing (FIG. 1) is a schematic diagram comparing the predetermined working range with the physical composite storage range of the high voltage energy storage device.

DETAILED DESCRIPTION OF THE DRAWINGS

In the illustrated embodiment the predetermined working range A (predetermined, usable charging range) of the high voltage energy storage device is shown as a subrange of the physical composite storage range (physical, theoretically usable charging range) of the high voltage energy storage device, arranged symmetrically about the 50% state of charge (SOC). The working range A is defined by its upper limit (working range upper limit) $A_O$ and its lower limit (working range lower limit) $A_U$. At this stage the working range A can be varied as a function of the vehicle operating parameters and/or the vehicle environmental parameters—that is, can be shifted at least upwards, in the direction of the upper physical charge limit $SOC_{upper}$, or downwards, in the direction of the lower physical charge limit $SOC_{lower}$. This shift takes place by shifting the upper and/or the lower limit ($A_O$, $A_U$).

In the case of low outside temperatures, the high voltage energy storage device consumes less charge current. Moreover, the current output decreases as the (outside) temperature falls. Therefore, at very low temperatures (for example, cold start condition −25° C.), the functions that are usually associated with the high voltage energy storage device are available only to a very limited degree. However, it must always be guaranteed that the internal combustion engine will start. Therefore, if, for example, a low seasonal temperature (winter) is determined owing to continuous temperature monitoring and analysis, then the working range A is shifted by shifting the range in its entirety or by shifting at least the lower limit $A_U$ in the direction of higher states of charge (upwards), because at higher states of charge of the high voltage energy storage device a higher performance of the same is generally guaranteed.

As soon as the outside temperatures permit a lower working range A (higher outside temperatures), the working range A is shifted again in the direction of the lower physical charge limit $SOC_{lower}$. Since the energy storage device is operated as much as possible in a lower working range A (working range of smaller quantities of charge and/or predetermined working range is arranged in the direction of the lower physical charge limit $SOC_{lower}$), it is possible to achieve less ageing.

The ageing of the high voltage energy storage device is used as another important criterion, as a function of which the working range is shifted. As the ageing of the energy storage device increases, the performance of the same decreases. In order to be able to compensate at least to some degree for the decrease in performance, the working range is also shifted as a function of the determined state of ageing of the energy storage device. In principle, with the increase in ageing the working range A is raised in the direction of the upper physical charge limit $SOC_{upper}$, in order to compensate for the lost performance of the energy storage device.

Moreover, the working range A of the energy storage device can also be shifted additionally or as an alternative as a function of the current operating modes of the motor vehicle (and/or the energy storage device). If, for example, the motor vehicle is in overrun mode, the operating mode can prioritize brake energy recovery mode (recuperation), and the working range can be shifted in the direction of the lower physical charge limit $SOC_{lower}$. In this way it is guaranteed that as much brake energy as possible is recovered (that is, converted into electric energy and fed into the high voltage energy storage device). If, in contrast, the current supply is prioritized by the high voltage accumulator—because, for example, a start of the internal combustion engine is intended, a driving mode that is at least partially electric is desired or a boost mode is demanded—the working range A is raised in the direction of the upper physical charge limit $SOC_{upper}$. Owing to this energy storage management important requirements (for example, engine start) can be guaranteed even in the case of an aged energy storage device and/or low ambient temperatures without having to greatly oversize the energy storage device.

In addition, the working range A of the energy storage device may also be set as a function of the driving style and by additional available information, for example, by way of the navigation system. If, for example, travel on the highway is determined by way of the speed or the navigation system, the working range can be shifted in the direction of a low state of charge, because prior to the next engine start a longer recuperation phase, which charges up again the energy storage device, can always be assumed. The same procedure is possible, if the navigation system predicts that the trip will take even longer until the destination is reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electric high voltage energy storage device of a hybrid vehicle with an electric drive motor, comprising:
    operating the characterized electric high voltage energy storage device in a predetermined working range of a state of charge of the high voltage energy storage device that is defined by an upper limit and a lower limit; and
    shifting the predetermined working range as a function of at least one of vehicle operating parameters and vehicle environmental parameters.

2. The method as claimed in claim 1, wherein the working range is shifted by shifting the lower limit while retaining the upper limit.

3. The method as claimed in claim 1, wherein the working range is shifted by shifting the upper limit and the lower limit.

4. The method as claimed in claim 3, wherein the size of the working range remains unchanged during the shifting step.

5. The method as claimed in claim 1, wherein one of the vehicle operating parameters is a state of ageing of the high voltage energy storage device.

6. The method as claimed in claim 5, wherein the state of ageing is determined by at least one of a predetermined computational algorithm, as a function of an operating period of the energy storage device, and as a function of an energy throughput through the energy storage device.

7. The method as claimed claim 1, wherein one of the vehicle environmental parameters is an outside temperature which is determined at least one of continuously and over a predetermined period of time.

8. The method as claimed in claim 7, wherein a predetermined minimum temperature is determined at least one of as a function of the outside temperature determined continuously, and as a function of the outside temperature determined over a predetermined period of time.

9. The method as claimed in claim 8, wherein the outside temperature is used to determine a current seasonal environment to permit selection of the predetermined minimum temperature from among at least two predetermined seasonal minimum temperature values.

10. The method as claimed in claim 1, wherein one of the vehicle operating parameters is a current operating mode of the motor vehicle.

11. The method as claimed in claim 10, wherein the current operating mode is one of pure internal combustion engine operation, purely electrical driving, brake energy recovery and boost mode.

12. An energy supply device for a hybrid vehicle with an electric drive motor, comprising:
   a high voltage energy storage device arranged to supply energy to the electric drive motor; and
   a control unit controlling charging and discharging events of the energy storage device, wherein the control unit controls a predetermined working range of a state of charge of the high voltage energy storage device that is defined by an upper limit and a lower limit by shifting the predetermined working range as a function of at least one of vehicle operating parameters and vehicle environmental parameters.

13. The energy supply device as claimed in claim 12, wherein the control unit shifts the working range by shifting the lower limit and while retaining the upper limit.

14. The energy supply device as claimed in claim 12, wherein the control unit shifts the working range by shifting the upper limit and the lower limit.

15. The energy supply device as claimed in claim 12, wherein the energy storage device includes lithium ion energy storage elements.

16. The energy supply device as claimed in claim 12, wherein the control unit shifts the working range as a function of at least one of a state of ageing of the high voltage energy storage device, as a function of at least one of an outside and a vehicle ambient temperature, and as a function of an operating mode of the hybrid vehicle.

* * * * *